(12) United States Patent
von der Embse

(10) Patent No.: US 7,277,382 B1
(45) Date of Patent: Oct. 2, 2007

(54) HYBRID WALSH ENCODER AND DECODER FOR CDMA

(75) Inventor: Urbain Alfred von der Embse, Westchester, CA (US)

(73) Assignee: Urbain A. von der Embse, Westchester, CA (US)

( * ) Notice: Subject to any disclaimer, the term of this patent is extended or adjusted under 35 U.S.C. 154(b) by 838 days.

(21) Appl. No.: 09/826,117

(22) Filed: Jan. 9, 2001

(51) Int. Cl.
*H04J 11/00* (2006.01)

(52) U.S. Cl. ........................................ 370/209; 370/335

(58) Field of Classification Search ................. 370/209
See application file for complete search history.

(56) References Cited

U.S. PATENT DOCUMENTS

| | | | | |
|---|---|---|---|---|
| 5,311,176 A | * | 5/1994 | Gurney | 341/50 |
| 5,805,567 A | * | 9/1998 | Ramesh | 370/204 |
| 5,862,453 A | * | 1/1999 | Love et al. | 455/69 |
| 5,956,345 A | * | 9/1999 | Allpress et al. | 370/480 |
| 6,317,413 B1 | * | 11/2001 | Honkasalo | 370/209 |
| 6,389,138 B1 | * | 5/2002 | Li et al. | 380/35 |
| 6,396,804 B2 | * | 5/2002 | Odenwalder | 370/209 |
| 6,674,712 B1 | * | 1/2004 | Yang et al. | 370/208 |
| 2002/0126741 A1 | * | 9/2002 | Baum et al. | 375/144 |

* cited by examiner

*Primary Examiner*—Huy D. Vu
*Assistant Examiner*—Rhonda Murphy

(57) ABSTRACT

The invention provides a method and system for the generation of Hybrid Walsh orthogonal codes for CDMA spreading and channelization encoding and fast decoding. Current art uses real Walsh orthogonal codes for CDMA spreading and orthogonal channelization. Hybrid Walsh codes are complex Walsh codes that have a isomorphic one-to-one correspondence with the discrete Fourier transform (DFT) codes and are derived by separate permutations of real Walsh codes for the real and for the imaginary components. Hybrid Walsh codes are the best approximation to the DFT within the constraints of a unity norm, 4-phases on real and imaginary axes, orthogonality, and therefore are a preferred choice for a complex Walsh code. The invention discloses a method for the Hybrid Walsh encoder to be generalized by combining with DFT, quasi-orthogonal PN codes, and other codes using a tensor product construction, direct sum construction, and functional combining.

3 Claims, 7 Drawing Sheets

Hybrid Walsh CDMA Encoding

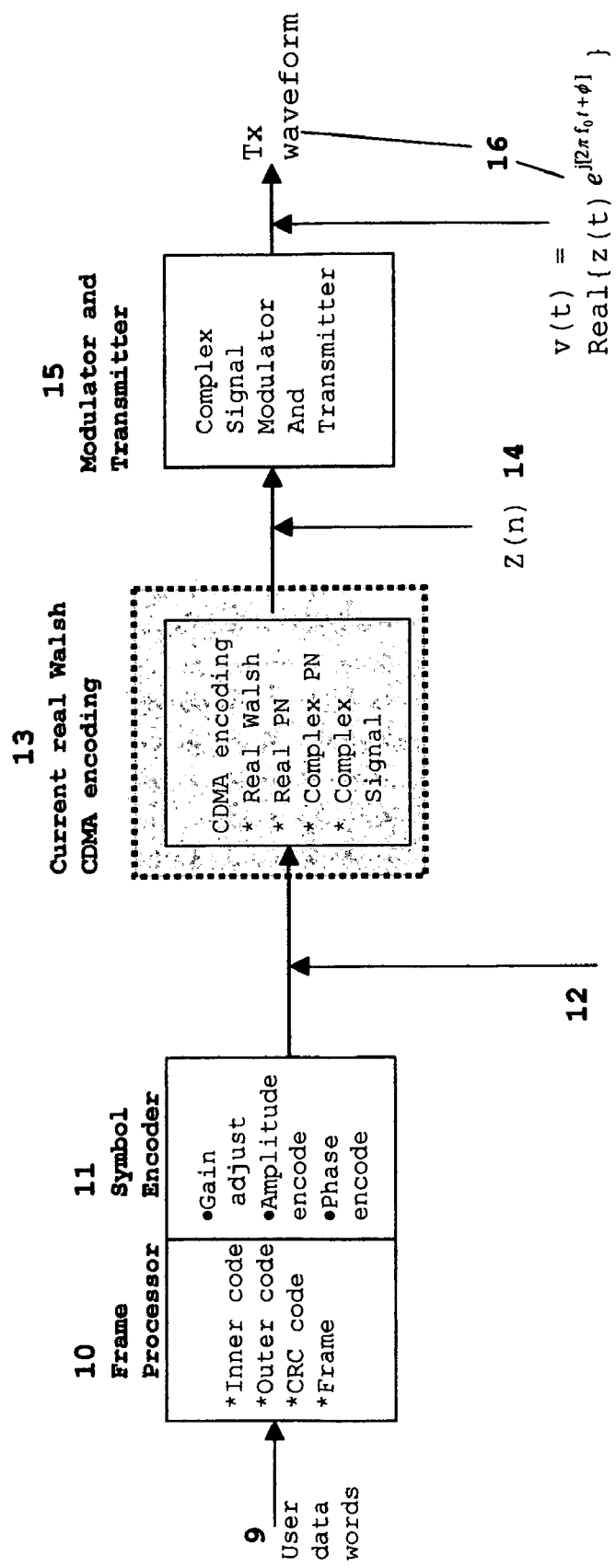
FIG. 1 CDMA Transmitter: Block Diagram

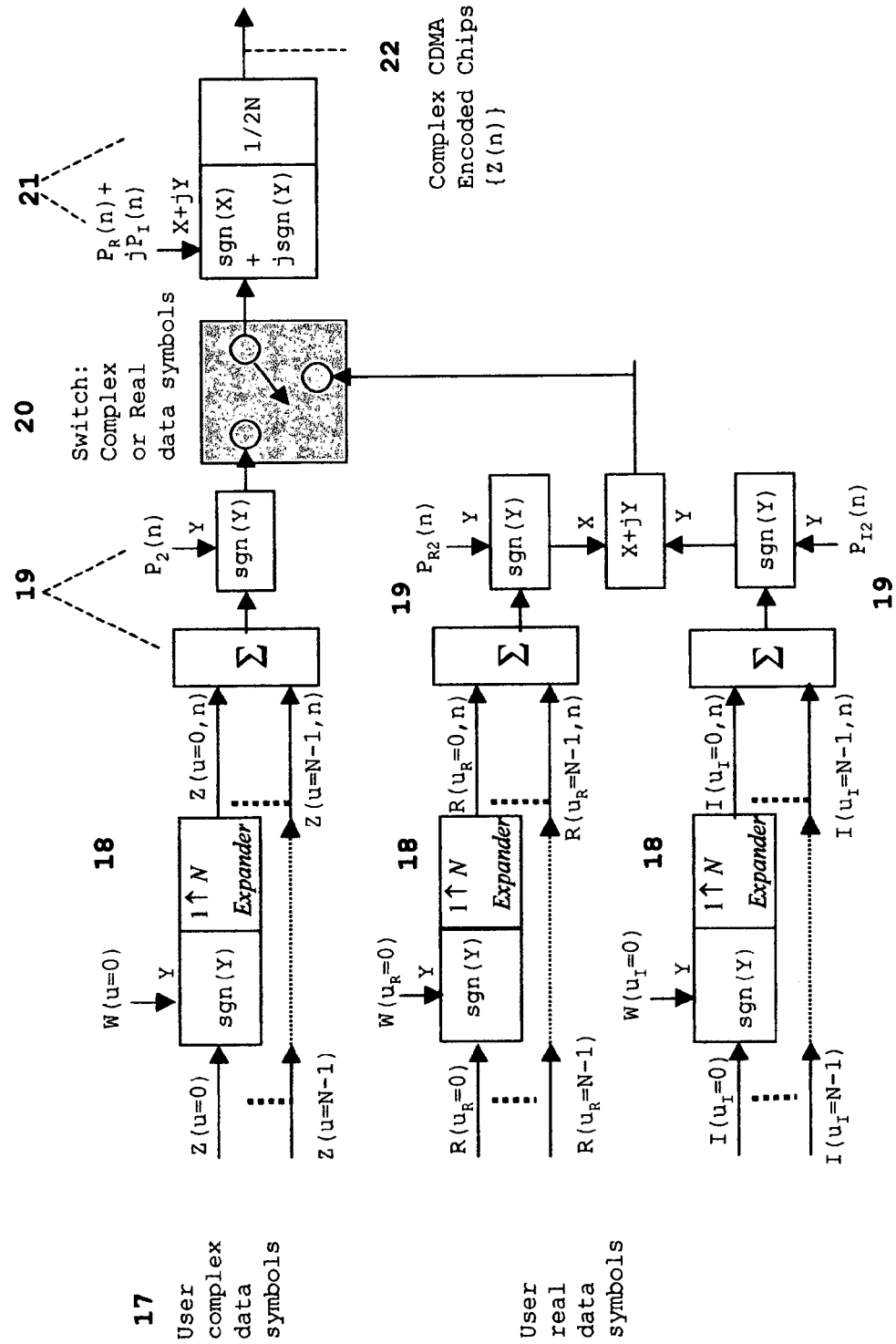
FIG. 2 Real Walsh CDMA Encoding

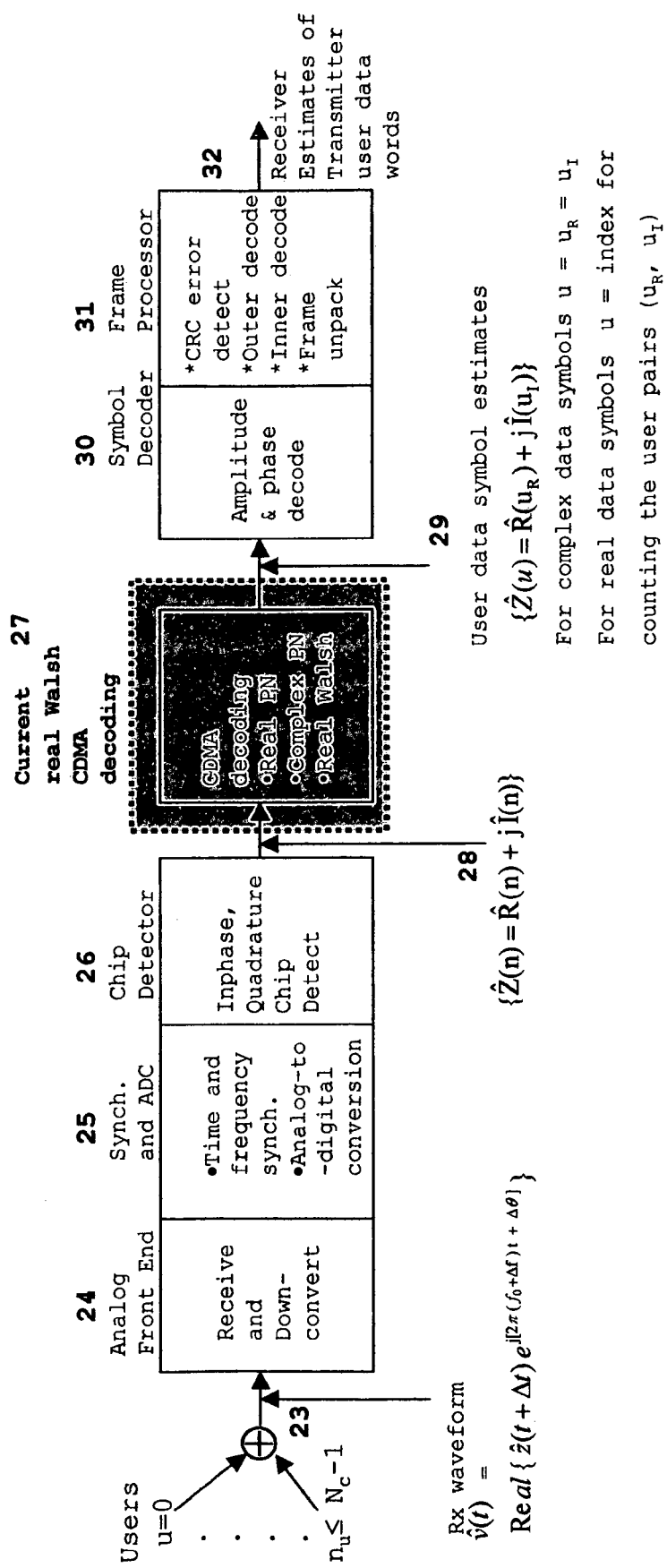
FIG. 3 CDMA Receiver Block Diagram

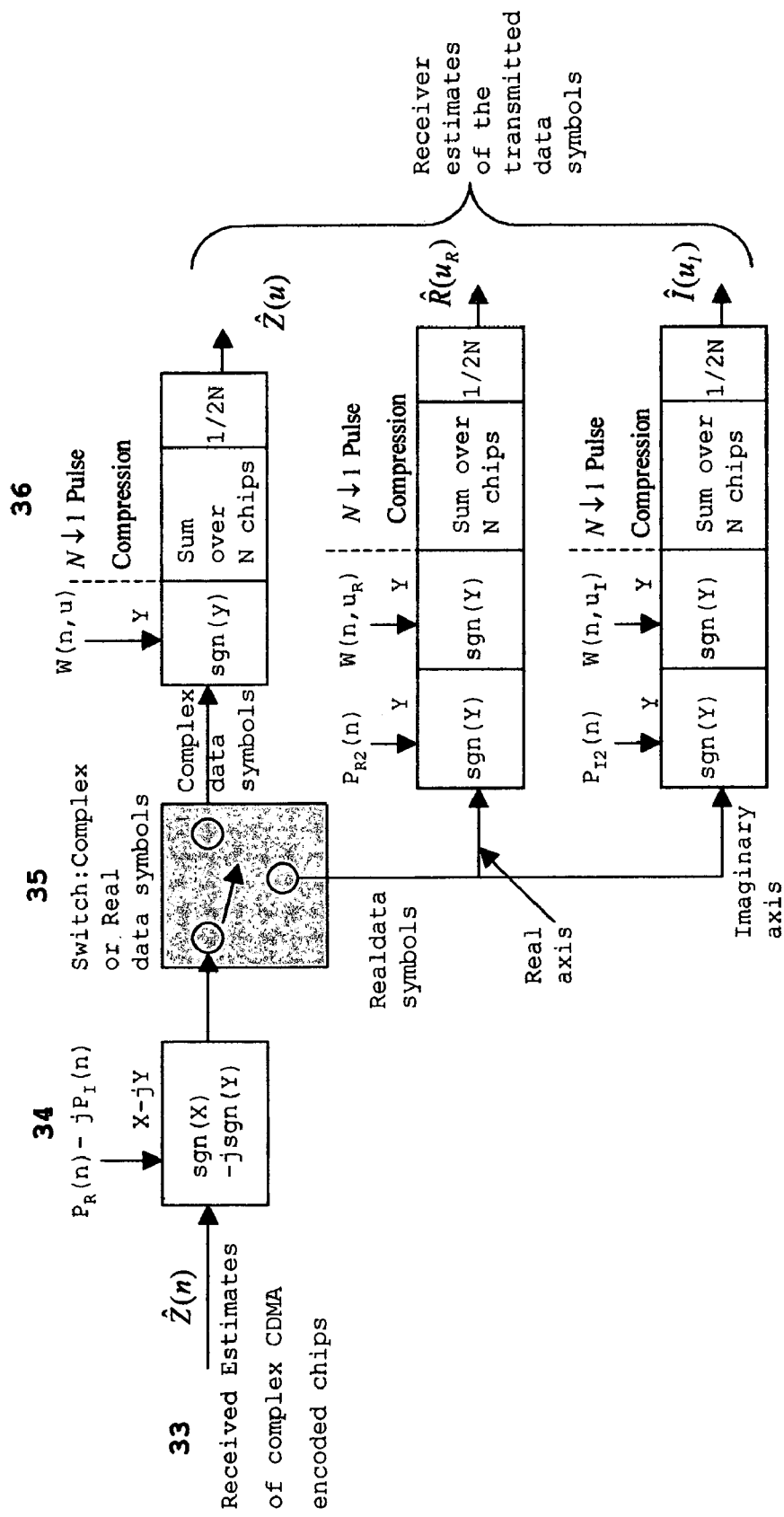
FIG. 4 Real Walsh CDMA Decoding

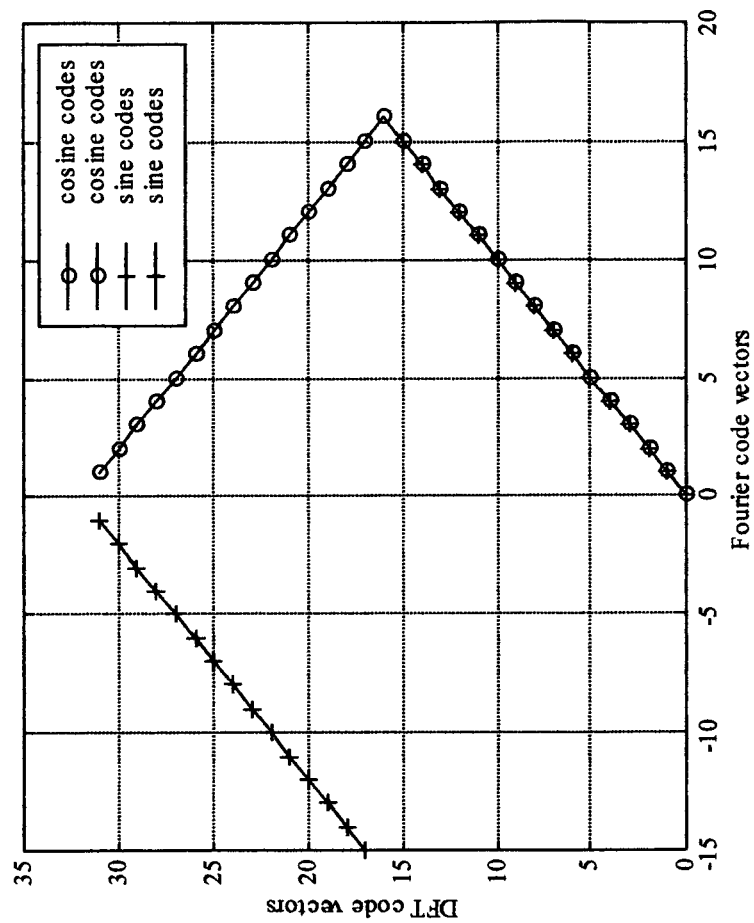
FIG. 5 Correlation of Fourier Codes with DFT Codes for N=32

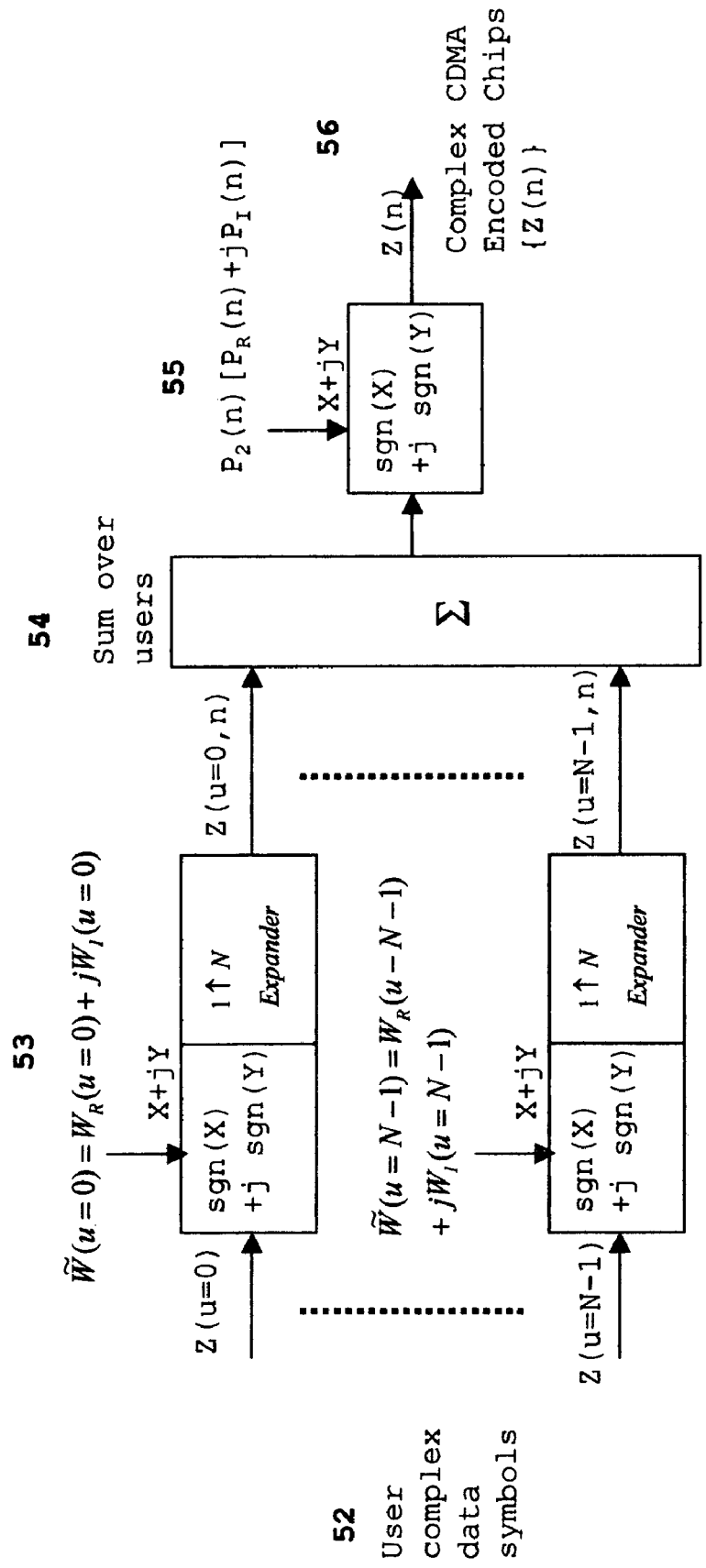
FIG. 6 Hybrid Walsh CDMA Encoding

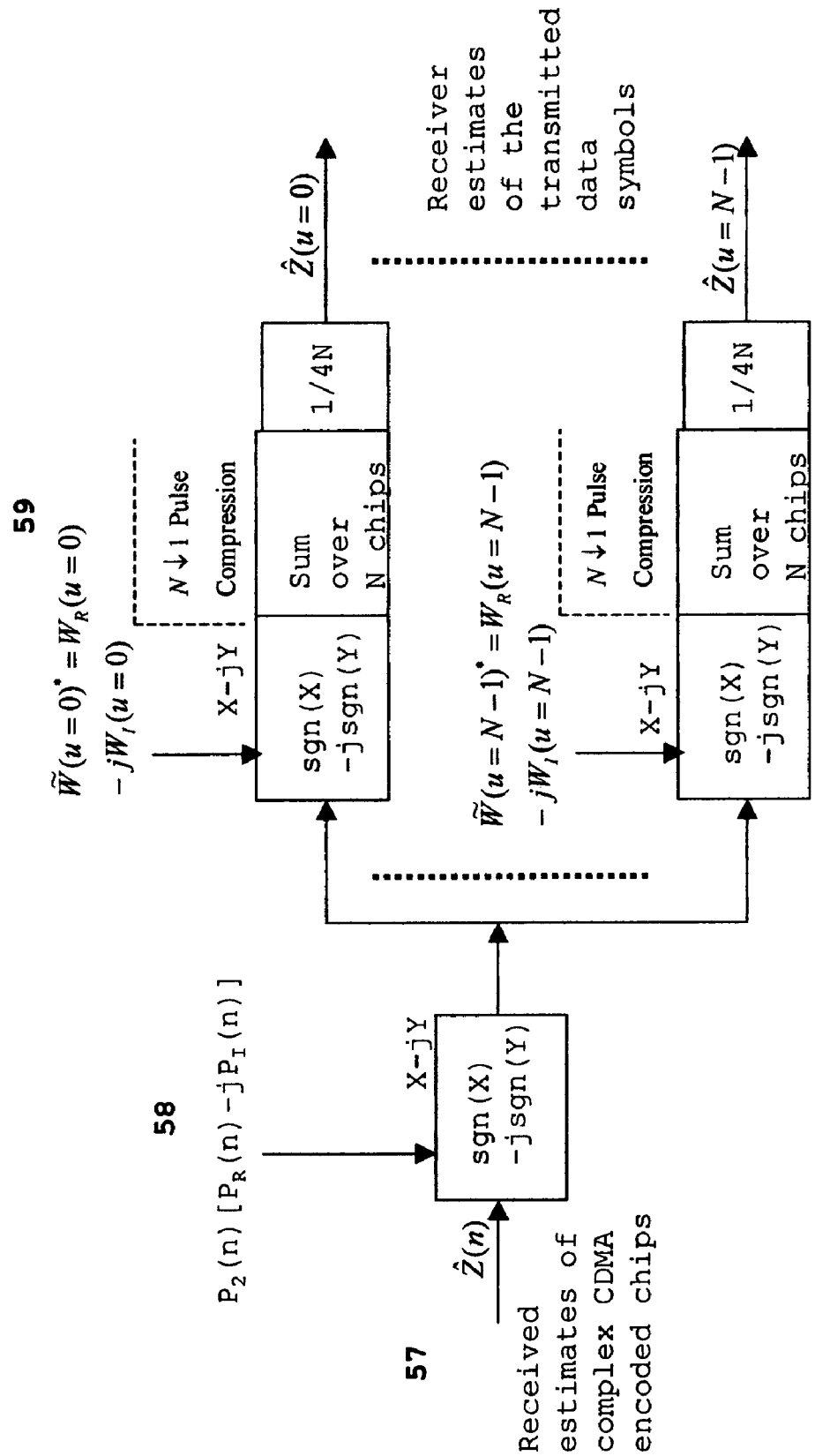
FIG. 7 Hybrid Walsh CDMA Decoding

HYBRID WALSH ENCODER AND DECODER FOR CDMA

BACKGROUND OF THE INVENTION

I. Field of the Invention

The present invention relates to CDMA (Code Division Multiple Access) cellular telephone and wireless data communications with data rates up to multiple T1 (1.544 Mbps) and higher (>100 Mbps), and to optical CDMA with data rates in the Gbps and higher ranges. Applications are mobile, point-to-point and satellite communication networks. More specifically the present invention relates to novel complex and generalized complex Walsh codes developed to replace current Walsh orthogonal CDMA channelization codes which are real Walsh codes.

II. Description of the Related Art

Current CDMA art is represented by the recent work on multiple access for broadband wireless communications, the G3 (third generation CDMA) proposed standard candidates, the current IS-95 CDMA standard, the early Qualcomm patents, and the real Walsh technology. These are documented in "Multiple Access for Broadband Networks", IEEE Communications magazine July 2000 Vol. 38 No. 7, "Third Generation Mobile Systems in Europe", IEEE Personal Communications April 1998 Vol. 5 No. 2, IS-95/IS-95A, the IS-95/IS-95A, the 3G CDMA2000 and W-CDMA, and the listed patents.

Current art using Walsh orthogonal CDMA channelization codes is represented by the scenario described in the following with the aid of equations (1) and FIG. 1,2,3,4. This scenario considers CDMA communications spread over a common frequency band for each of the communication channels with each channel defined by a CDMA code. These CDMA communications channels for each of the users are defined by assigning a unique Walsh orthogonal spreading codes to each user. The Walsh code for each user spreads the user data symbols over the common frequency band. These Walsh encoded user signals are summed and re-spread over the same frequency band by long and short pseudo-noise PN codes, to generate the CDMA communications signal which is modulated and transmitted. The communications link consists of a transmitter, propagation path, and receiver, as well as interfaces and control.

It is assumed that the communication link is in the communications mode with all of the users communicating at the same symbol rate and the synchronization is sufficiently accurate and robust to support this communications mode. In addition, the possible power differences between the users is assumed to be incorporated in the data symbol amplitudes prior to the CDMA encoding in the CDMA transmitter, and the power is uniformly spread over the wideband by proper selection of the CDMA pulse waveform.

Transmitter equations (1) describe a representative real Walsh CDMA encoding for the transmitter in FIG. 1. It is assumed that there are N Walsh code vectors W(u) each of length N chips 1. The code vector is presented by a 1×N N-chip row vector $W(u) = [W(u,1), \ldots, W(u,N)]$ where W(u,n) is chip n of code u. The code vectors are the row vectors of the Walsh matrix W. Walsh code chip n of code vector u has the possible values $W(u,n) = +/-1$. Each user is assigned a unique Walsh code which allows the code vectors to be. designated by the user symbols $u = 0, 1, \ldots, N-1$ for N Walsh codes. User data symbols 2 are the set of complex symbols $\{Z(u), u = 0, 1, \ldots, N-1\}$ and the set of real symbols $(R(u_R), I(u_I), u_R, U_I = 0, 1, \ldots, N-1)$ where Z is a complex symbol and R,I are real symbols assigned to the real, imaginary communications axis. Examples of complex user symbols are QPSK and OQPSK encoded data corresponding to 4-phase and offset 4-phase symbol coding. Examples of real user symbols are PSK and DPSK encoded data corresponding to 2-phase and differential 2-phase symbol coding. Although not considered in this example, it is possible to use combinations of both complex and real data symbols.

Current real Walsh CDMA encoding for transmitter (1)

1 Walsh codes $$W = \text{Walsh } N \times N \text{ orthogonal code matrix consisting of}$$
$$N \text{ rows of } N \text{ chip code vectors}$$
$$= [W(u)] \text{ matrix of row vectors } W(u)$$
$$= [W(u, n)] \text{ matrix of elements } W(u, n)$$
$$W(u) = \text{Walsh code vector } u \text{ for } u = 0, 1, \ldots, N-1$$
$$= [W(u, 0), W(u, 1), \ldots, W(u, N-1)]$$
$$= 1 \times N \text{ row vector of chips } W(u, 0), \ldots, W(u, N-1)$$
$$W(u, n) = \text{Walsh code } u \text{ chip } n$$
$$= +/+1 \text{ possible values}$$

2 Data symbols

Z(u)=Complex data symbol for user u $R(U_R)$=Real data symbol for user $U_R$ assigned to the Real axis of the CDMA signal $I(u_I)$=Real data symbol for user $u_I$ assigned to th Imaginary axis of the CDMA signal 3 Walsh encoded data Complex data symbols $$Z(u, n) = Z(u)sgn\{W(u, n)\}$$
$$= \text{User } u \text{ chip } n \text{ Walsh encoded complex data}$$

Real data symbols $$R(u_R, n) = R(u_R)sgn\{W(u_R, n)\}$$
$$= \text{User } u_R \text{ chip } n \text{ Walsh encoded}$$
$$\text{real data}$$
$$I(u_I, n) = R(u_R)sgn\{W(u_R, n)\}$$
$$= \text{User } u_I \text{ chip } n \text{ Walsh encoded}$$
$$\text{real data}$$

where sgn{(o)}=Algeraic sign of "(o)"

4 PN scrambling $P_2(n), P_{R2}(n), P_{I2}(n)$=Chip n of long PN codes $P_R(n)$=Chip n of short PN code for real axis $P_I(n)$=Chip n of short PN code for imaginary axis Complex data symbols:

$$Z(n) = PN \text{ scrambled Walsh encoded data chips after summing over}$$
$$\text{the users}$$
$$= \sum_n Z(u, n)P_2(n)[P_R(n) + jP_I(n)]$$
$$= \sum_u Z(u, n)sgn\{P_2(n)\}[sgn\{P_R(n)\} + jsgn\{P_I(n)\}]$$
$$= \text{Real Walsh } CDMA \text{ encoded complex chips}$$

Real data symbols:

$$Z(n) = \left[\sum_{u_R} R(u_R, n)\text{sgn}\{P_{R2}(n)\} + j\sum_{u_I} I(u_I, n)\text{sgn}\{P_{I2}(n)\}\right][\text{sgn}\{P_R(n)\} +$$

$$j\text{sgn}\{P_I(n)\}]$$

= Real Walsh CDMA encoded real chips

User data is encoded by the Walsh CDMA codes 3. Each of the user symbols Z(u) R ($u_R$), I($u_I$) is assigned a unique Walsh code. W(u),W($u_R$),W($u_I$). Walsh encoding of each user data symbol generates an N-chip sequence with each chip in the sequence consisting of the user data symbol with the sign of the corresponding Walsh code chip, which means each chip =[Data symbol]×[Sign of Walsh chip].

The Walsh encoded data symbols are summed and encoded with PN codes 4. These long PN codes are 2-phase with each chip equal to +/−1 which means PN encoding consists of sign changes with each sign change corresponding to the sign of the PN. chip. Short PN codes are complex with 2-phase codes along their real and imaginary axes. Encoding with a long PN means each chip of the summed Walsh encoded data symbols has a sign change when the corresponding long PN chip is −1, and remains unchanged for +1 values. This operation is described by a multiplication of each chip of the summed Walsh encoded data symbols with the sign of the PN chip. Purpose of the PN encoding is to provide scrambling of the summed Walsh encoded data symbols as well as isolation between groups of users and synchronization. PN encoding uses a long PN which is real followed by a short PN which is complex with real code components on the inphase and quadrature axes as shown in 4.

Receiver equations (2) describe a representative Walsh CDMA decoding for the receiver in FIG. 3. The receiver front end 5 provides estimates $\{\hat{Z}(n)=\hat{R}(n)+j\,\hat{I}(n)\}$ of the transmitted real Walsh CDMA encoded chips {Z(n)=R(n)+jI(n)} for the complex and real data symbols. Orthogonality property 6 is expressed as a matrix product of the Walsh code chips or equivalently as a matrix product of the Walsh code chip numerical signs. Decoding algorithms 8 perform the inverse of the signal processing for the encoding in equations (1) to recover estimates $\{\hat{Z}(u)\}$ or $\{\hat{R}(u_R), \hat{I}(u_I)\}$ of the transmitter user symbols $\{Z(u)\}$ or $\{R(u_R), I(u_I)\}$ for the respective complex or real data symbols.

Current real Walsh CDMA decoding for receiver (2)

5 Receiver front end provides estimates $\{\hat{Z}(n)=\hat{R}(n)+j\hat{I}(n)\}$ of the encoded transmitter chip symbols {Z(n)=R(n)+jI(n)} for the complex and real data symbols

6 Orthogonality property of Walsh N×N.matrix W $$\sum_n W(\hat{u}, n)W(n, u) = \sum_n \text{sign}\{W(\hat{u}, n)\}\text{sign}\{W(n, u)\}$$

$$= N\delta(\hat{u}, n)$$

where $\delta(\hat{u}, u)$ = Delta function of $\hat{u}$ and $u$

= 1 for $\hat{u} = u$

= 0 otherwise

7 PN decoding property:

$$P_2(n)P_2(n) = \text{sgn}\{P_2(n)\}\text{sgn}\{P_2(n)\}$$

$$= 1$$

Decoding algorithm:
Complex Data Symbols $$\hat{Z}(u) = 2^{-1}N^{-1}\sum_n \hat{Z}(n)[\text{sign}\{P_2(n)\} - j\text{sign}\{P_I(n)\}]\text{sgn}\{W(n, u)\}$$

= Receiver estimate of the transmitted complex data symbol Z(u)

Real Data Symbols $$\hat{R}(u_R) = \text{Real}\left[2^{-1}N^{-1}\sum_n \hat{Z}(n)[\text{sgn}\{P_R(n)\} - j\text{sgn}\{P_I(n)\}]\right.$$

$$\text{sgn}\{P_2(n)\}\text{sgn}\{W(n, u_R)\}$$

= Receiver estimate of the transmitted complex data symbol R($u_R$)

$$I(u_I) = \text{Imag}\left[2^{-1}N^{-1}\sum_n \hat{Z}(n)[\text{sgn}\{P_R(n)\} - j\text{sgn}\{P_I(n)\}]\right.$$

$$\text{sgn}\{P_2(n)\}\text{sgn}\{W(n, u_I)\}$$

= Receiver estimate of the transmitted complex data symbol I($u_I$)

FIG. 1 CDMA transmitter block diagram is representative of a current CDMA transmitter which includes an implementation of the current real Walsh CDMA channelization encoding in equations (1). This block diagram becomes a representative implementation of the CDMA transmitter which implements the complex Walsh CDMA encoding of this invention disclosure when the current real Walsh CDMA encoding 13 is replaced by the complex Walsh CDMA encoding. Signal processing starts with the stream of user input data words 9. Frame processor 10 accepts these data words and performs the encoding and frame formatting, and passes the outputs to the symbol encoder 11 which encodes the frame symbols into amplitude and phase coded symbols 12 which could. be complex IZ(u).} or real {R($u_R$), I($u_I$)) depending on the application. These symbols 12 are the inputs to the current real Walsh CDMA encoding in equations (1). Inputs {Z(u)}, {R($u_R$), I ($u_I$)) 12 are Walsh encoded, summed over the users, and scrambled by PN in the current Walsh CDMA encoder 13 to generate the complex output chips {Z(n)} 14. This encoding 13 is a representative implementation of equations (1). These output chips. Z (n) are waveform modulated 15 to generate the analog complex signal z(t) which is single sideband upconverted, amplified, and transmitted (Tx) by the analog front end. of the transmitter 15 as the real waveform v(t) 16 at the carrier frequency $f_0$ whose amplitude is the real part of the complex envelope of the baseband waveform z(t) multiplied by the carrier frequency and the phase angle φ accounts for the phase change from the baseband signal to the transmitted signal.

FIG. 2 real Walsh CDMA encoding is a representative implementation of the Walsh CDMA encoding 13 in FIG. 1 and in equations (1). Inputs are the user data symbols which could be complex {Z(u)} or real {R($u_R$), I($u_I$)} 17. For complex and real data symbols the encoding of each user by the corresponding Walsh code is described in 18 by the implementation of transferring the sign of each Walsh code chip to the user data symbol followed by a 1-to-N expander 1↑N of each data symbol into an N chip sequence using the sign transfer of the Walsh chips.

For complex data symbols $\{Z(u)\}$ the sign-expander operation 18 generates the N-chip sequence $Z(u,n)=Z(u) \text{sgn}\{W(u,n)\}=Z(u)W(u,n)$ for $n=0 \mu l, \ldots, N-1$ for each user $u=0 \mu l, \ldots, N-1$. This Walsh encoding serves to spread each user data symbol into an orthogonally encoded chip sequence which is spread over the CDMA communications frequency band. The Walsh encoded chip sequences for each of the user data symbols are summed over the users 19 and encoded with a long code $P_2(n)$ followed by a short code $[P_R(n)+jP_I(n)]$ 21. Output is the stream of complex CDMA encoded chips $\{Z(n)\}$ 22. The switch 20 selects the appropriate signal processing path for the complex and real data symbols.

For real data symbols $\{R(u_R), jI(u_I)\}$ the real and imaginary communications axis data symbols are separately Walsh encoded 18, summed 19, and then PN encoded 19 with long codes $P_{R2}(n)$ for the real axis and $P_{I2}(n)$ for the imaginary axis to provide orthogonality between the channels along the real and imaginary communications axes. Output is complex combined 19 and PN encoded with the short PN sequence $[P_R(n)+jP_I(n)]$ 21. Output is the stream of complex CDMA encoded chips $\{Z(n)\}$ 22.

FIG. 3 CDMA receiver block diagram is representative of a current CDMA receiver which includes an implementation of the current real Walsh CDMA decoding in equations (2). This block diagram becomes a representative implementation of the CDMA receiver which implements the complex Walsh CDMA decoding when the current real Walsh CDMA decoding 27 is replaced by the complex Walsh CDMA decoding of this invention. FIG. 3 signal processing starts with the user transmitted wavefronts incident at the receiver antenna 23 for the $n_u$ users $u=1, \ldots, n_u \leq N_c$. These wavefronts are combined by addition in the antenna to form the receive (Rx) signal $\hat{v}(t)$ at the antenna output 23 where $\hat{v}(t)$ is an estimate of the transmitted signal $v(t)$ 16 in FIG. 1, that is received with errors in time $\Delta t$, frequency $\Delta f$, phase $\Delta \theta$, and with an estimate $\hat{z}(t)$ of the transmitted complex baseband signal $z(t)$ 16 in FIG. 1. This received signal $\hat{v}(t)$ is amplified and downconverted by the analog front end 24 and then synchronized (synch.) and analog-to-digital (ADC) converted 25. Outputs from the ADC are filtered and chip detected 26 by the fullband chip detector, to recover estimates $\{\hat{Z}(n)=\hat{R}(n)+j\hat{I}(n)\}$ 28 of the transmitted signal which is the stream of complex CDMA encoded chips $\{Z(n)=R(n)+jI(n)\}$ 14 in FIG. 1 for both complex and real data symbols. The CDMA decoder 27 implements the algorithms in equations (2) by stripping off the PN codes and decoding the received CDMA real Walsh orthogonally encoded chips to recover estimates $\{\hat{Z}(u)=\hat{R}(u_R)+j\hat{I}(u_1)\}$ 29 of the transmitted user data symbols $\{Z(u)=R(u_R)+jI(u_I)\}$ 12 in FIG. 1. Notation introduced in FIGS. 1 and 3 assumes that the user index $U=u_R=u_I$ for complex data symbols, and for real data symbols the user index u is used for counting the user pairs $(u_R, u_I)$ of real and complex data symbols. These estimates are processed by the symbol decoder 30 and the frame processor 31 to recover estimates 32 of the transmitted user data words.

FIG. 4 real Walsh CDMA decoding is a representative implementation of the real Walsh CDMA decoding 27 in FIG. 3 and in equations (2). Inputs are the received estimates of the complex CDMA encoded chips $\{\hat{Z}(n)\}$ 33. The PN codes are stripped off from these chips 34 by multiplying by the numerical sign of the real and imaginary components of the complex conjugate of the PN code as per the decoding algorithms 7 in equations (2).

For complex data symbols 35 the long PN code is stripped off and the real Walsh channelization coding is removed by a pulse compression operation consisting of multiplying each received chip by the numerical sign of the corresponding Walsh chip for the user, scaling by 1/2N, and summing the products over the N Walsh chips 36 to recover estimates $\{\hat{Z}(u)\}$ of the user complex data symbols $\{Z(u)\}$. The switch 35 selects the appropriate signal processing path for the complex and real data symbols.

For real data symbols 35 the next signal processing operation is the removal of the remaining PN codes from the real and imaginary axes. This is followed by stripping off the Walsh channelization coding by multiplying each received chip by the numerical sign of the corresponding Walsh chip for the user, scaling by 1/2N, and summing the products over the N Walsh chips 36 to recover estimates $(\hat{R}(u_R), \hat{I}(u_1)\}$ of the user real data symbols $\{R(u_R), I(u_I)\}$.

It should be obvious to anyone skilled in the communications art that these example implementations clearly define the fundamental current CDMA signal processing relevant to this invention disclosure and it is obvious that these examples are representative of the other possible signal processing approaches.

For cellular applications the transmitter description describes the transmission signal processing applicable of this invention for both the hub and user terminals, and the receiver describes the corresponding receiving signal processing for the hub and user terminals for applicability of this invention.

SUMMARY OF THE INVENTION

This invention is a new approach to the application of Walsh orthogonal codes for CDMA, which offers to replaces the current real Walsh codes with complex Walsh codes called hybrid Walsh codes and generalized complex Walsh codes called generalized hybrid Walsh codes. Real Walsh codes are used for current CDMA applications and complex Walsh codes will provide the choice of using complex Walsh codes or the real Walsh codes since the permutated real Walsh codes are the real components of the complex Walsh codes. This means an application capable of using the complex Walsh codes can simply turn-off the complex axis components of the complex Walsh codes for real Walsh CDMA coding and decoding.

The complex Walsh codes of this invention are proven to be the natural development for the Walsh codes and therefore are the correct complex Walsh codes to within arbitrary factors that include scale and rotation, which are not relevant to performance. This natural development of the complex Walsh codes in the N-dimensional complex code space $C^N$ extended the correspondences between the real Walsh codes and the Fourier codes in the N-dimensional real code space $R^N$, to correspondences between the complex Walsh codes and the discrete Fourier transform (DFT) complex codes in $C^N$.

These 4-phase complex Walsh orthogonal CDMA codes provide fundamental performance improvements compared to the 2-phase real Walsh codes which include an increase in the carrier-to-noise ratio (CNR) for data symbol recovery in the receiver, lower correlation side-lobes under timing offsets both with and without PN spreading, lower levels of harmonic interference caused by non-linear amplification of multi-carrier CDMA signals, and reduced phase tracking jitter for code tracking to support both acquisition and synchronization. These potential performace improvements simply reflect the widely known principle that complex CDMA is better than real CDMA.

The gemeralized complex Walsh orthogonal CDMA codes increase the choices for the code length by allowing the combined use of hybrid Walsh, Walsh, and discrete Fourier transform complex orthogonal codes using a Kronecker or tensor cconstruction, direct sum construction, as well as the possibility for more general functional combining.

BRIEF DESCRIPTION OF THE DRAWINGS AND THE PERFORMANCE DATA

The above-mentioned and other features, objects, design algorithms, implementations, and performance advantages of the present invention will become more apparent from the detailed description set forth below when taken in conjunction with the drawings and performance data wherein like reference characters and numerals denote like elements, and in which:

FIG. 1 is a representative CDMA transmitter signal processing implementation block diagram with emphasis on the current real Walsh CDMA encoding which contains the signal processing elements addressed by this invention disclosure.

FIG. 2 is a representative CDMA encoding signal processing implementation diagram with emphasis on the current real Walsh CDMA encoding which contains the signal processing elements addressed by this invention disclosure.

FIG. 3 is a representative CDMA receiver signal processing implementation block diagram with emphasis on the current real Walsh CDMA decoding which contains the signal processing elements addressed by this invention disclosure.

FIG. 4 is a representative CDMA decoding signal processing implementation diagram with emphasis on the current real Walsh CDMA decoding which contains the signal processing elements addressed by this invention disclosure.

FIG. 5 is a representative correlation plot of the correlation between the complex discrete Fourier transform (DFT) cosine and sine code component vectors and the real Fourier transform cosine and sine code component vectors.

FIG. 6 is a representative CDMA encoding signal processing implementation diagram with emphasis on the hybrid Walsh CDMA encoding which contains the signal processing elements addressed by this invention disclosure FIG. 7 is a representative CDMA decoding signal processing implementation diagram with emphasis on the hybrid Walsh CDMA decoding which contains the signal processing elements addressed by this invention disclosure.

DISCLOSURE OF THE INVENTION

Consider the real orthogonal CDMA code space $R^N$ for Hadamard, Walsh, and Fourier codes. The new complex Walsh orthogonal CDMA codes are called hybrid Walsh codes and are derived from the current real Walsh codes by starting with the correspondence of the current real Walsh codes with the discrete real Fourier transform basis vectors. Examples of code sets in $R^N$ consisting of N-orthogonal real code vectors include the Hadamard, Walsh, and Fourier. The corresponding matrices of code vectors are designated as H, W, F respectively and as defined in equation (3) consist of N-rows of N-chip code vectors. Hadamard codes in their re-ordered form known as Walsh codes are used in the current CDMA, in the proposals for the next generation G3 CDMA, and in the proposals for all future CDMA. Walsh codes re-order the Hadamard codes according to increasing sequency. Sequency is the average rate of change of the sign of the codes.

Equation (3) define the three sets H,W,F of real orthogonal codes in $R^N$ with the understanding that the H and W are identical except for the ordering of the code vectors. Hadamard 37. and Walsh 38 orthogonal functions are basis vectors in $R^N$ and are used as code vectors for orthogonal CDMA channelization coding. Hadamard 37 and Walsh 38 equations of definition are widely known. Likewise, the Fourier 39 equations of definition are widely known within the engineering and scientific communities, wherein N-Chip Real Orthogonal CDMA Codes (3)

37 Hadamard Codes $$H = \text{Hadamard } N \times N \text{ orthogonal code matrix}$$
$$\text{consisting of } N \text{ rows of } N \text{ chip code vectors}$$
$$= [H(U)] \text{ matrix of row vectors } H(U)$$
$$= [H(u, n)] \text{ martix of elements } H(u, n)$$
$$H(u) = \text{Hadamard code vector } u$$
$$= [H(u, 0), H(u, 1), \ldots, H(u, N-1)]$$
$$= 1 \times N \text{ row vector of chips } H(u, 0), \ldots, H(u, N-1)$$
$$H(u, n) = \text{Hadamard code } u \text{ chip } n$$
$$= +/+1 \text{ possible values}$$
$$= (-1) \wedge \left[ \sum_{i=0}^{i=M-1} u_i n_i \right]$$
$$\text{where } u = \sum_{i=0}^{i=M-1} u_i 2^i \text{ binary representation of } u$$
$$n = \sum_{i=0}^{i=M-1} n_i 2^i \text{ binary representation of } n$$

38 Walsh Codes $$W = \text{Walsh } N \times N \text{ orthogonal code matrix consisting of}$$
$$N \text{ rows of } N \text{ chip code vectors}$$
$$= [W(u)] \text{ matrix of chip code vectors}$$
$$= [W(u, n)] \text{ matrix of elements } W(u, n)$$
$$W(u) = \text{Walsh code } u \text{ chip } n$$
$$= [W(u, 0), W(u, 1), \ldots, W(u, N-1)]$$
$$W(u, n) = \text{Walsh code } u \text{ chip } n$$
$$= +/+1 \text{ possible values}$$
$$= (-1) \wedge \left[ u_{M-1} n_0 + \sum_{i=0}^{i=M-1} (u_{M-1-i} + u_{M-i}) n_i \right]$$

39 Fourier codes $$F = \text{Fourier } N \times N \text{ orthogonal code matrix consisting of}$$
$$N \text{ rows of } N \text{ chip code vectors}$$

-continued $$= [F(u)] \text{ matrix of row vectors } F(u)$$

$$= \begin{bmatrix} C \\ S \end{bmatrix}$$

$C = N/2 + 1 \times N$ matrix of row vectors $C(u)$ $C(u) = $ Even code vectors for $u = 0, 1, \ldots, N/2$ $\quad = [1, \cos(2\pi\, u/n), \ldots, \cos(2\pi\, u/2)]$ $S = N/2 - 1 \times N$ matrix of row vectors $S(u)$ $S(\Delta u) = $ Odd code vectors for $u = N/2 +$ $\quad \Delta u, \Delta u = 1, 2, \ldots, N/2 - 1$ $\quad = [\sin(2\pi\Delta u/N), \ldots, \sin(2\pi\Delta u(1/2 - 1/N))]$ where $F(u) = C(u)$ for $u = 0, 1, \ldots, N/2$ $\quad = S(\Delta u)$ for $\Delta u = u - N/2, u = N/2 + 1, \ldots, N - 1$ the cosine C(u) and sine S(u) code vectors are the code vectors of the Fourier code matrix F.

Consider the complex orthogonal CDMA code space $C^N$ for DFT codes. The DFT orthogonal codes are a complex basis for the complex N-dimensional CDMA code space $C^N$ and consist of the DFT harmonic code vectors arranged in increasing order of frequency. Equations (4) are the definition of the DFT code vectors. The DFT definition 40 is widely known within the engineering and scientific communities. Even and odd components of the DFT code vectors 41 are the real cosine code vectors {C(u)} and the imaginary sine code vectors (S(u)} where even and odd are referenced to the midpoint of the code vectors. These cosine and sine code vectors are the extended set 2N of the N Fourier cosine and sine code vectors.

N-Chip DFT Complex Orthogonal CDMA Codes (4)
40 DFT Code Vectors $E = DFT\ N \times N$ orthogonal code matrix consisting of $\quad N$ rows of $N$ chip code vectors $\quad = [E(u)]$ matrix of row vectors $E(u)$ $\quad = [E(u, n)]$ matrix of elements $E(u, n)$ $E(u) = DFT$ code vectors $u$ $\quad = [E(u, 0), E(u, 1), \ldots, E(u, N-1)]$ $\quad = 1 \times N$ row vector of chips $E(u, 0), \ldots, E(u, N-1)$ $E(u, n) = DFT$ code $u$ chip $n$ $\quad = e^{j2\pi un/N}$ $\quad = \cos(2\pi un/N) + j\sin(2\pi un/N)$ $\quad = N$ possible values on the unit circle

41 Even and Odd Code Vectors are the Extended Set of Fourier Even and Odd Code Vectors in 39 Equations (3)

$C(u) = $ Even code vectors for $u = 0, 1, \ldots, N - 1$ $\quad = [1, \cos(2\pi\, u\, 1/N), \ldots, \cos(2\pi\, u\, (N-1)/N)]$ $S(u) = $ Odd code vectors for $u = 0, 1, \ldots, N - 1$ $\quad = [0, \sin(2\pi\, u\, 1/N), \ldots, \sin(2\pi\, u\, (N-1)/N)]$ $E(u) = C(u) + j\, S(u)$ for $u = 0, 1, \ldots, N-1$ Consider the complex orthogonal CDMA code space $C^N$ for hybrid Walsh codes. Step 1 in the derivation of the hybrid Walsh codes in this invention establishes the correspondence of the even and odd Walsh codes with the even and odd Fourier codes. Even and odd for these codes are with respect to the midpoint of the row vectors similar to the definition for the DFT vector codes 41 in equations (4). Equations (5) identify the even and odd Walsh codes in the W basis in $R^N$. These even and odd Walsh codes can be placed in Even and Odd Walsh Codes in $R^N$ (5)

$W_e(u) = $ Even Walsh code vector $\quad = W(2u)$ for $u = 0, 1, \ldots, N/2 - 1$ $W_o(u) = $ Odd Walsh code vectors $\quad = W(2u - 1)$ for $u = 1, \ldots, N/2$ direct correspondence with the Fourier code vectors 39 in equations (3) using the DFT equations (4). This correspondence is defined in equations (6) where the correspondence operator "~" represents the even and odd correspondence between the Walsh and Fourier codes, and additionally represents the sequency~frequency correspondence.

Correspondence Between Walsh and Fourier Codes (6)

$W(0) \sim C(0)$ $W_e(u) \sim C(u)$ for $u = 1, \ldots, N/2 - 1$ $W_o(u) \sim S(u)$ for $u = 1, \ldots, N/2 - 1$ $W(N - 1) \sim C(N/2)$ Step 2 derives the set of N complex DFT vector codes in $C^N$ from the set of N real Fourier vector codes in $R^N$. This means that the set of 2N cosine and sine code vectors in 41 in equations (4) for the DFT codes in $C^N$ will be derived from the set of N cosine and sine code vectors in 39 in equations (3) for the Fourier codes in $R^N$. The first N/2+1 code vectors of the DFT basis can be written in terms of the Fourier code vectors in equations (7).

DFT Code Vectors 0, 1, . . . ,N/2 Derived from Fourier (7)

42 Fourier code vectors from 39 in equations (3) are $C(u) = $ Even code vectors for $u = 0, 1, \ldots, N/2$ $\quad = [1, \cos(2\pi\, u1/N), \ldots, \cos(2\pi\, u/2)]$ $S(u) = $ Odd code vectors for $u = 1, 2, \ldots, N/2 - 1$ $\quad = [\sin(2\pi\, u1/N), \ldots, \sin(2\pi\, u\, (1/2 - 1/N))]$ 43 DFT code vectors in 41 of equations (4) are written as functions of the Fourier code vectors $$E(u) = DFT \text{ complex code vectors for } u = 0, 1, \ldots, N/2 \quad (5)$$
$$= C(0)$$
$$= C(u) + jS(u) \text{ for } u = 1, \ldots, N/2 - 1$$
$$= C(N/2) \quad \text{for } u = N/2$$

The remaining set of N/2+1, ..., N−1 DFT code vectors in $C^N$ can be derived from the original set of Fourier code vectors by a correlation which establishes the mapping of the DFT codes onto the. Fourier codes. We derive this mapping by correlating the real and imaginary components of the DFT code vectors with the corresponding even and odd components of the Fourier code vectors. The correlation operation is defined in equations (8)

$$\text{Correlation of } DFT \text{ and Fourier code vector} \quad (8)$$
$$Corr(\text{even}) = C * \text{Real}\{E'\}$$
$$= \text{Correlation matrix}$$
$$= \text{Matrix product of } C \text{ and the real part of } E \text{ transpose}$$
$$Corr(\text{odd}) = S * Imag\{E'\}$$
$$= \text{Correlation matrix}$$
$$= \text{Matrix product of } S \text{ and the imaginary part}$$
$$\text{of } E \text{ transpose}$$

wherein "*" is the matrix product, "'" is the conjugate transpose operator, and the results of the correlation calculations are plotted in FIG. 5 for N=32 for the real cosine and the odd sine Fourier code vectors. Plotted are the correlation of the 2N DFT cosine and sine codes against the N Fourier cosine and sine codes which range from −15 to +16 where the negative indices of the codes represent a negative correlation value. The plotted curves are the correlation peaks. These correlation curves in FIG. 5 prove that the remaining N/2+1, ..., N−1 code vectors of the DFT are derived from the Fourier code vectors by equations (9). This DFT code vectors N/2+1, ..., N−1 derived from Fourier (9)

$$E(u)=C(N/2-\Delta u)-jS(N/2-\Delta u)$$

for $u=N/2+\Delta u$ $\Delta u=1, \ldots, N/2-1$ construction of the remaining DFT basis in equations (9) is an application of the DFT spectral foldover property which observes the DFT harmonic vectors for frequencies fNT=N/2+Δu above the Nyquist sampling rate fNT=N/2 simply foldover such that the DFT harmonic vector for fNT =N/2+Δu is the DFT basis vector for fNT =N/2−Δu to within a fixed sign and where "f" is frequency and "T" is sample interval.

Step 3 derives the hybrid Walsh code vectors from the real Walsh code vectors by using the DFT derivation in equations (7) and (9), by using the correspondences between the real Walsh and Fourier in equations (6), and by using the fundamental correspondence between the hybrid Walsh and the complex DFT given in equation (10).

Correspondence Between Hybrid Walsh and DFT (10)

$$\tilde{W} \sim E = N \times N \text{ complex } DFT \text{ orthogonal code matrix where}$$
$$\tilde{W} = N \times N \text{ hybrid Walsh orthogonal code matrix}$$
$$= N \text{ rows of } N \text{ chip code vectors}$$
$$= [\tilde{W}(u, n)] \text{ matrix of row vectors } \tilde{W}(u)$$
$$= [\tilde{W}(u, n)] \text{ matrix of elements } \tilde{W}(u, n)$$
$$\tilde{W}(u) = \text{Hybrid Walsh code vector } u$$
$$= [\tilde{W}(u, 0), \tilde{W}(u, 1), \ldots, \tilde{W}(u, N-1)]$$
$$\tilde{W} = +/-1 \quad +/-j \text{ possible value}$$

We start by constructing the hybrid Walsh dc code vector $\tilde{W}(0)$. We use equation E(0)=C(0) in 43 in equations (7), the correspondence in equations (6), and observe that the dc hybrid Walsh vector has both real and imaginary components in the $\tilde{W}$ domain, to derive the dc hybrid Walsh code vector equation:

$$\tilde{W}(0)=W(0)+jW(0) \text{ for } u=0 \quad (11)$$

For hybrid Walsh code vectors $\tilde{W}(u)$, u=1, 2, ..., N/2−1, we start with the Walsh code properties in (5), (6) and apply the correspondences in equations (10) between the hybrid Walsh and DFT bases, to the DFT equations 43 in equations (7) to derive the equations:

$$\tilde{W}(u) = W_e(u) + jW_o(u) \quad \text{for } u = 1, 2, \ldots, N/2 - 1 \quad (12)$$
$$= W(2u) + jW(2u - 1) \quad \text{for } u = 1, 2, \ldots, N/2 - 1$$

For hybrid Walsh code vector $\tilde{W}(N/2)$ we use the equation E(N/2)=C(N/2) 43 in equations (7) and the same rationale used to derive equation (11), to derive the equation:

$$\tilde{W}(u)=W(N-1)+jW(N-1) \text{ for } u=N/2 \quad (13)$$

For hybrid Walsh code vectors $\tilde{W}(N/2+\Delta u)$, $\Delta u=1, 2, \ldots, N/2-1$ we apply the correspondences between the hybrid Walsh and DFT bases to the spectral foldover equation E(N/2+Δu)=C(N/2−Δu)−jS(N/2−Δu) in equation (9) with the changes in indexing required to account for the W indexing in equations (5),(6) to derive the equations:

$$\tilde{W}(N/2 + \Delta u) = W(N - 1 - \Delta eu) + W(N - 1 - \Delta ou) \quad (14)$$
$$\text{for } u = N/2 + 1, \ldots, N - 1$$
$$= W(N - 1 - 2\Delta u) + jW(N - 2\Delta u)$$
$$\text{for } u = N/2 + 1, \ldots, N - 1$$

using the notation Δeu=2Δu, Δou=2Δu−1. These hyubrid Walsh code vectors in equations (11), (12), (13), (14) are the equations of definition for the hybrid Walsh code vectors.

An equivalent way to derive the hybrid Walsh code vectors in $C^N$ from the real Walsh basis in $R^{2N}$ is to use a sampling technique which is a known method for deriving a complex basis in $C^N$ from a real basis in $R^{2N}$.

Transmitter equations (15) describe a representative hybrid Walsh CDMA encoding for the transmitter in FIG.

11 It is assumed that there are N hybrid Walsh code vectors $\tilde{W}(u)$ 44 which are the 1×N row vectors of the N×N hybrid Walsh matrix $\tilde{W}$. Each user is assigned a unique Walsh code which allows the code vectors to be designated by the user symbols u=0, 1, . . . , N−1 for N hybrid Walsh codes. The hybrid Walsh code vectors $\tilde{W}(u)$ derived in equations (11), (12),(13),(14) are summarized 44 in terms of their real and imaginary component code vectors $\tilde{W}(u)=W_R(u)+jW_I(u)$ where $W_R(u)$ and $W_I(u)$ are respectively the real and imaginary component code vectors. As per the derivation of $\tilde{W}(u)$ the sets of real axis code vectors $\{W_R(U)\}$ and the imaginary axis code vectors $\{W_I(u)\}$ both consist of the Walsh code vectors in $R^N$ with the ordering modified to ensure that the definition of the hybrid Walsh vectors satisfies equations (11), (12), (13), (14).

Hybrid Walsh CDMA encoding for transmitter (15)

$$\tilde{W}(u) = \text{Hybrid Walsh code vector } u$$
$$= W_R(u) + jW_I(u) \text{ for } u = 0, 1, \ldots, N-1 \text{ where}$$
$$W_R(u) = \text{Real}\{\tilde{W}(u)\}$$
$$= W(0) \quad \text{for } u = 0$$
$$= W(2u) \quad \text{for } u = 1, 2, \ldots, N/2-1$$
$$= W(N-1) \quad \text{for } u = N/2$$
$$= W(2N-2u-1) \text{ for } u = N/2+1, \ldots, N-1$$
$$W_r(u) = \text{Imag}\{\tilde{W}(u)\}$$
$$= W(0) \quad \text{for } u = 0$$
$$= W(2u-1) \quad \text{for } u = 1, 2, \ldots, N/2-1$$
$$= W(N-1) \quad \text{for } u = N/2$$
$$= W(2N-2u) \quad \text{for } u = N/2+1, \ldots, N-1$$

45 Data Symbols $$Z(u) = \text{Complex data symbol for user } u$$
$$= R(u) + jI(u)$$

46 Hybrid Walsh Encoded Data $$Z(u, n) = Z(u) \tilde{W}(u, n)$$
$$= Z(u) [sgn\{W_R(u, n)\} + jsgn\{W_I(u, n)\}]$$
$$= [R(u)sgn\{W_R(u, n)\} - I(u)sgn\{W_I(u, n)\}] +$$
$$j[R(u)sgn\{W_I(u, n)\} + I(u, n)sgn\{W_R(u, n)\}]$$

47 PN Scrambling $$Z(n) = PN \text{ scrambled complex Walsh encoded data chips after}$$
$$\text{summing over the user}$$
$$= \sum_u Z(u, n)P_2(n) [P_R(n) + jP_I(n)]$$
$$= \sum_u Z(u, n)sgn\{P_2(N)\} [sgn\{P_R(n)\} + jsgn\{P_I(n)\}]$$
$$= \text{Hybrid Walsh } CDMA \text{ encoded chips}$$

User data symbols 45 are the set of complex symbols $\{Z(u), u=0, 1 \ldots, N-1\}$. These data symbols are encoded by the hybrid Walsh CDMA codes 46, encoded with PN scrambling codes comprising both long and short codes 47, and summed over the users to yield the hybrid Walsh CDMA encoded chips Z(n). Combinations of both real and complex data symbols can be used similar to the approach for the real Walsh in equations (1).

Receiver equations (16) describe a representative hybrid Walsh CDMA decoding for the receiver in FIG. 3. The receiver front end 48 provides estimates $\{\hat{Z}(n)\}$ of the transmitted Walsh CDMA encoded chips $\{Z(n)\}$ for the complex data symbols $\{Z(u)\}$. Orthogonality property 49 is expressed as a matrix product of the hybrid Walsh code chips or equivalently as a matrix of the hybrid Walsh code chip numerical signs of the real and imaginary components. Decoding algorithms 51 perform the inverse of the signal processing for the encoding in equations (15) to recover estimates $\{\hat{Z}(u)\{$ of the transmitter user symbols $\{Z(n)\}$ for the complex data symbols $\{Z(u)\}$. Combinations of both real and complex data symbols can be used similar to the approach for the real Walsh in equations (2).

Hybrid Walsh CDMA Decoding for Receiver (16)

48 Receiver front end in FIG. 3 provides estimates $\{Z(n)\}$ 28 of the encoded transmitter chip symbols $\{Z(n)\}$ 47 in equations (15).

49 Orthogoality property of Walsh N×N matrix $\tilde{W}$ $$\sum_n \tilde{W}(\hat{u}, n)\tilde{W}'(n, u) = \sum_n [sgn\{W_R(\hat{u}, n)\} + jsgn\{W_I(\hat{u}, n)]$$
$$[sgn\{W_R(n, u) - jsgn\{W_I(n, u)\}]$$
$$= 2N \ \delta(\hat{u}, u)$$
$$\text{where } \delta(\hat{u}, u) = \text{Delta function of } \hat{u} \text{ and } u$$
$$= 1 \text{ for } \hat{u} = u$$
$$= 0 \text{ otherwise}$$

51 Decoding algorithm $$\hat{Z}(u) = 4^{-1}N^{-1} \sum_n \hat{Z}(n)sgn\{P_2(n)\}[sgn\{P_R(n)\} -$$
$$j \ sgn\{P_I(n)\}] *= [sgn\{W_R(n, u)\} - j \ sgn\{W_I(n, u)\}]$$
$$= \text{Receiver estimate of the transmitted data}$$
$$\text{symbol } Z(u) \ \textbf{45} \text{ in equations (15)}$$

FIG. 6 hybrid Walsh CDMA encoding is a representative implementation of the hybrid Walsh CDMA encoding which will replace the current real Walsh encoding 13 in FIG. 1 and is defined in equations (15). Inputs are the user data symbols $\{Z(u)\}$ 52. Encoding of each user by the corresponding hybrid Walsh code implements the hybrid Walsh encoding in 46 in equations (15). Encoded chip sequences for each of the user data symbols are summed over the users 54 followed by PN encoding with long and short codes 55. Output is the stream of complex CDMA encoded chips $\{Z(n)\}$ 56. Combinations of both real and complex data symbols can be used similar to the approach for the real Walsh in FIG. 2.

FIG. 7 hybrid Walsh CDMA decoding is a representative implementation of hybrid Walsh CDMA decoding which will replace the current real Walsh decoding 27 in FIG. 3, and is defined in equations (16). Inputs are the received estimates of the complex CDMA encoded chips $\{\hat{Z}(n)\}$ 57. The PN scrambling code is stripped off from these chips 58 using the decoding algorithm in equations (16). The hybrid Walsh channelization coding is removed 59 and the output scaled by 1/4N to recover estimates $\{\tilde{Z}(u)\}$ of the user complex data symbols $\{Z(u)\}$. Combinations of both real and complex data symbols can be used similar to the approach for the real Walsh in FIG. 4.

It should be obvious to anyone skilled in the communications art that this example implementations in FIG. 6, 7 clearly define the fundamental CDMA signal processing relevant to this invention disclosure and it is obvious that this example is representative of the other possible signal processing approaches.

For cellular applications the transmitter description describes the transmission signal processing applicable to this invention for both the hub and user terminals, and the receiver describes the corresponding receiving signal processing for the hub and user terminals for applicability to this invention.

Consider complex orthogonal CDMA code space $C^N$ for generalized hybrid Walsh codes which allow the code length N to be a product of powers of primes 60 in equations (17) or a sum of powers of primes 61 in equations (17), at the implementation cost of introducing multiply operations into the CDMA encoding and decoding. In the previous disclosure of this invention the N was assumed to be equal to a power of 2 which means N=2^m corresponding to prime $p_0$=2 and integer M=$m_0$. This restriction was made for convenience in explaining the construction of the hybrid Walsh and is not required since it is well known that Hadamard matrices exist for non-integer powers of 2 and, therefore, hybrid Walsh matrices exist for non-integer powers of 2.

Length N of Generalized Hybrid Walsh Codes (17)
60 Kronecker or Tensor Product Code Construction $$N = \prod_k p_k \wedge m_k$$
$$= \prod_k N_k$$

where $p_k$ = prime number indexed by $k$ starting with $k = 0$ $m_k$ = order of the prime number $p_k$ $N_k$ = Length of code for the prime $p_k$ $= p_k \wedge m_k$

61 Direct Sum Code Construction $$N = \sum_k p_k \char`^ m_k$$
$$= \sum_k N_k$$

Add-only arithmetic operations are required for encoding and decoding both real Walsh and hybrid Walsh CDMA codes since the real Walsh values are +/−1 and the hybrid Walsh values are {+/−1 +/−j} or equivalently are {1, j, −1, −j} under a −90 degree rotation and normalization which means the only operations are sign transfers and adds plus subtracts add-only algebraic operations. Multiply operations are more complex to implement than add operations. However, the advantages of having greater flexibility in choosing the orthogonal CDMA code lengths N using equations (17) can offset the expense of multiply operations for particular applications. Accordingly, this invention includes the concept of generalized hybrid Walsh orthogonal CDMA codes with the flexibility to meet these needs. This extended class of hybrid Walsh codes supplements the hybrid Walsh codes by combining with Hadamard, real Walsh, DFT, and other orthogonal codes as well as with quasi-orthogonal PN by relaxing the orthogonality property to quasi-orthogonality.

Generalized hybrid Walsh orthogonal CDMA codes can be constructed as demonstrated in 64 and 65 in equations (18) for the Kronecker or tensor product, and in 66 for the direct sum. The example code matrices considered for orthogonal CDMA codes in 62 for the construction of the generalized hybrid Walsh are the DFT E and Hadamard H or equivalently Walsh W, in addition to the hybrid Walsh $\tilde{W}$. The algorithms and examples for the construction start with the definitions 63 of the N×N orthogonal code matrices $\tilde{W}$= $\tilde{W}N$, E=$E_N$, H=$H_N$ for N=2,4. and the equivalence of $E_4$ and $\tilde{W}_4$ after the $\tilde{W}_4$ is rotated through the angle −45 degrees and rescaled. The CDMA current and developing standards use the prime 2 which generates a code length N=$2^M$ where M=integer. For applications requiring greater flexibility in code length N, additional primes can be used using the tensor construction. This flexibility is illustrated in 65 with the addition of prime=3. The use of prime=3 in addition to the prime=2 in the range of N=8 to N=64 is observed to increase the number of N choices at a modest cost penalty of using multiples of the angle increment 30 degrees for prime=3 in addition to the angle increment 90 degrees for prime=2. As noted in 65 there are several choices in the ordering of the tensor product construction and 2 of these choices are used in the construction and these choices yield different sets of orthogonal codes. Direct sum construction provides greater flexibility in the choice of N without necessarily introducing a multiply penality. However, the addition of the zero matrix in the construction is generally not desirable for CDMA communications.

Construction of Generalized Hybrid Walsh Orthogonal Codes (18)
62 Code Matrices $\tilde{W}_N$=N×N hybrid Walsh code matrix $E_N$=N×N DFT Code Matrix $H_N$=N×N Hadamard Code Matrix

63 Low-Order Code Definitions and Equivalences $2 \times 2$ $\quad H_2 = \begin{bmatrix} 1 & 1 \\ 1 & -1 \end{bmatrix}$
$\quad\quad\quad\quad = E_2$
$\quad\quad\quad\quad = \left(e^{-j\pi/4}/\sqrt{2}\right) * \tilde{W}_2$ $3 \times 3$ $\quad E_3 = \begin{bmatrix} 1 & 1 & 1 \\ 1 & e^{j2\pi/3} & e^{j2\pi2/3} \\ 1 & e^{j2\pi2/3} & e^{j2\pi/3} \end{bmatrix}$ $4 \times 4$ $\quad H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$ $\quad\quad\quad\tilde{W}_4 = \begin{bmatrix} 1+j & 1+j & 1+j & 1+j \\ 1+j & -1+j & -1-j & 1-j \\ 1+j & -1-j & 1+j & -1-j \\ 1+j & 1-j & -1-j & -1+j \end{bmatrix}$ -continued $$E_4 = \begin{bmatrix} 1 & 1 & 1 & 1 \\ 1 & j & -1 & -j \\ 1 & -1 & 1 & -1 \\ 1 & -j & -1 & j \end{bmatrix}$$

$$= (e^{-j\pi/4}/\sqrt{2})\tilde{W}_4$$

$$N = \prod_k N_k$$

Code matrix $C_N$=N×N Generalized Hybrid Walsh CDMA Code Matrix

Kronecker or tensor product construction of $C_N$ $$C_N = C_0 \prod_{k>0} \bigotimes C_{N_k}$$

Kronecker or tensor product definition
A =$N_a$×$N_a$ orthogonal code matrix [$a_{ik}$]
B=$N_b$×$N_b$ orthogonal code matrix $A \otimes B$ = Kronecker or tensor product of matrix $A$
and matrix $B$
= $N_a N_b \times N_a N_b$ orthogonal code matrix consisting
of the elements [$a_{ik}$] of matrix $A$ multiplied
by the matrix $B$
= [$a_{ik} B$]

65 Kronecker or Tensor Product Construction Examples for Primes p=2,3 and the Range of Sizes 8≦N≦64

$$8 \times 8 \quad C_8 = \tilde{W}_8$$
$$12 \times 12 \quad C_{12} = \tilde{W}_4 \otimes E_3$$
$$C_{12} = E_3 \otimes \tilde{W}_4$$
$$16 \times 16 \quad C_{16} = \tilde{W}_{16}$$
$$18 \times 18 \quad C_{18} = \tilde{W}_2 \otimes E_3 \otimes E_3$$
$$C_{18} = E_3 \otimes E_3 \otimes \tilde{W}_2$$
$$24 \times 24 \quad C_{24} = \tilde{W}_8 \otimes E_3$$
$$C_{24} = E_3 \otimes \tilde{W}_8$$
$$32 \times 32 \quad C_{32} = \tilde{W}_{32}$$
$$36 \times 36 \quad C_{36} = \tilde{W}_4 \otimes \tilde{W}_3 \otimes \tilde{W}_3$$
$$C_{36} = \tilde{W}_3 \otimes \tilde{W}_3 \otimes \tilde{W}_4$$
$$48 \times 48 \quad C_{48} = \tilde{W}_{16} \otimes \tilde{W}_3$$
$$C_{48} = \tilde{W}_3 \otimes \tilde{W}_{16}$$
$$64 \times 64 \quad C_{64} = \tilde{W}_{64}$$

66 Direct sum construction for $$N = \sum_k N_k$$

Code matrix $C_N$=N×N hybrid orthogonal CDMA code matrix Direct sum construction of $C_N$ $$C_N = C_0 \prod_{k>0} \bigotimes C_{N_k}$$

Direct sum definition $A = N_a \times N_a$ orthogonal code matrix $B = N_b \times N_b$ orthogonal code matrix $A \oplus B$ = Direct sum of matrix $A$ and matrix $B$ = $N_a + N_b \times N_a + N_b$ orthogonal code matrix $$= \left[\begin{array}{c|c} A & O_{N_a \times N_b} \\ \hline O_{N_b \times N_a} & B \end{array}\right]$$

where $O_{N_1 \times N_2} = N_1 \times N_2$ zero matrix

It should be obvious to anyone skilled in the communications art that these example implementations of the generalized hybrid Walsh in equations (18) clearly define the fundamental CDMA signal processing relevant to this invention disclosure and it is obvious that this example is representative of the other possible signal processing approaches. For example, the Kronecker or tensor product matrices $E_N$ and $H_N$ can be replaced by functionals.

For cellular applications the transmitter description which includes equations (18) describes the transmission signal processing applicable to this invention for both the hub and user terminals, and the receiver corresponding to the decoding of equations (18) describes the corresponding receiving signal processing for the hub and user terminals for applicability to this invention.

Consider computationally efficient encoding and decoding of complex Walsh CDMA codes and hybrid complex Walsh CDMA codes. It is well known that fast and efficient encoding and decoding algorithms exist for the real Walsh CDMA codes. It is obvious that with suitable modifications these algorithms can be used to develop fast and efficient encoding and decoding algorithms for the hybrid Walsh CDMA codes since these complex codes have real and imaginary code vectors which are from the same set of real Walsh CDMA codes.

It is well known that the Kronecker or tensor product construction involving DFT, H and real Walsh orthogonal code vectors have efficient encoding and decoding algorithms. It is obvious that with suitable modifications these algorithms can be used to develop fast and efficient encoding and decoding algorithms for the Kronecker or tensor products of DFT, H and hybrid Walsh CDMA codes since these hybrid Walsh codes have real and imaginary code vectors which are from the same set of real Walsh CDMA codes. It is obvious that fast.and efficient encoding and decoding algorithms exist for direct sum construction and functional combining.

Preferred embodiments in the previous description is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the wider scope consistent with the principles and novel features disclosed herein.

What is claimed is:

1. A method for implementation of hybrid Walsh complex orthogonal codes for CDMA, said method comprising the steps of:
    forming N Walsh codes each with N chips wherein N is a power of 2,
    classifying said Walsh codes into even codes and odd codes according to the Walsh codes even and odd properties,
    defining said Walsh codes by $\{+1, -1\}$ valued orthogonal Hadamard codes reordered with increasing sequency, wherein
    sequency is the average rate of phase changes over each N chip code length,
    reordering N discrete Fourier transform codes each with N real chips according to increasing frequency for even and odd codes,
    constructing a one-to-one correspondence of said N Walsh codes with said N Discrete Fourier transform (DFT) codes such that sequency corresponds to frequency, even codes correspond to even codes, and odd codes correspond to odd codes,
    arranging said DFT codes in increasing frequency, wherein each code is the complex addition of a real axis code and an imaginary axis code,
    constructing a mapping which uses said N Fourier codes to construct said DFT codes,
    using said mapping and said correspondence of sequency and frequency, and even and odd codes to generate real and imaginary axis component codes of said hybrid Walsh codes,
    said hybrid Walsh codes W(c) with code index c=0, 1, 2, ..., -1, are re-orderings of said Walsh codes defined by equations for $c = 0$,  $\tilde{W}(c) = W(0) + jW(0)$
    for $c = 1, 2, \ldots, N/2 - 1$,  $\tilde{W}(c) = W(2c) + jW(2c - 1)$
    for $c = N/2$,  $\tilde{W}(c) = W(N-1) + jW(N-1))$
    for $c = N/2 + 1, \ldots, N-1$,  $\tilde{W}(c) = W(2N - 2c - 1) + jW(2N - 2c)$ wherein W(u) is said Walsh code for index u and $j=\sqrt{-1}$,
    generating hybrid Walsh codes by reading code chip values from Walsh code memory and writing to said hybrid Walsh code memory,
    reading said hybrid Walsh codes from said Hybrid Walsh code memory and,
    using said hybrid Walsh codes in an encoder for a CDMA communications link transmitter by replacing existing said Walsh real codes with said hybrid Walsh complex codes and in a decoder for a communications link receiver, in order to spread the data symbols over the transmission bandwidth.

2. The method of claim 1 wherein said codes have properties:
    code chips take values $\{1+j, -1+j, -1-j, 1-j\}$ in the complex plane,
    code chips with a renormalization and rotation of the code matrix take values $\{1, j, -1, -j\}$ in said complex plane,
    inphase axis codes of said codes are re-ordered Walsh or Hadamard codes and,
    quadrature axis codes of said codes are re-ordered Walsh or Hadamard codes.

3. The method of claim 1, further comprising the steps of:
    using tensor products also called Kronecker products to construct a second code which is a generalized hybrid Walsh code,
    whrein an example 24 chip tensor product code is constructed from a 8 chip hybrid Walsh code and a 3 chip discrete Fourier transform DFT code,
    said 24 chip tensor product code is defined by a 24 row by 24 column code matrix $C_{24}$ wherein row vectors are code vectors and column elements are code chips,
    said 8 chip hybrid Walsh code is defined by a 8 row by 8 column code matrix $\tilde{W}_8$,
    said 3 chip DFT code is defined by a 3 row by 3 column code matrix $E_3$,
    said $C_{24}$ is constructed by tensor product of said $\tilde{W}_8$ with said $E_3$ defined by equation $C_{24} = \tilde{W}_8 \otimes \tilde{W}_3$ wherein symbol "$\otimes$" is a tensor product operation,
    row u+1 and column n+1 matrix element $C_{24}$ (u+1, n+1) of said $C_{24}$ is defined by equation $C_{24}(u+1, n+1) = \tilde{W}(u_0+1, n_0+1) E_3(u_1+1, n_1+1)$ wherein $$u = u_1 + 3u_0$$
    $$= 0, 1, \ldots, 23$$
    $$n = n_1 + 3n_0$$
    $$= 0, 1, \ldots, 23$$

wherein u,n are code and chip indices for said codes $C_{24}$ and $u_0, n_0$ are code and chip indices for said code $\tilde{W}_8$ and $u_1, n_1$ are code and chip indices for said code $E_3$,
    wherein said encoder and said decoder for CDMA communications have memories assigned to $C_{24}$, $\tilde{W}_8$, $E_3$ codes,
    said $C_{24}$ codes are generated by reading code chip values from said memory and said $E_3$ memory and combining using said equations to yield said chip values for said $C_{24}$ and stored in said memory $C_{24}$,
    said $C_{24}$ codes are read from said memory and implemented in said encoder and said decoder,
    using direct products to construct a second code which is a generalized hybrid Walsh code,
    wherein an example 11 chip direct product code is constructed from said 8 chip hybrid Walsh code and said 3 chip DFT code,
    said 11 chip code is defined by the 11 row by 11 column code matrix $C_{11}$,
    said $C_{11}$ is constructed by direct product of said $\tilde{W}_8$ with said $E_3$ defined by equation $C_{11} = \tilde{W}_8 \oplus E_3$ wherein symbol "$\oplus$" is a direct product operation, row u+1 and column n+1 matrix element $C_{11}(u+1,m+1)$ of said $C_{11}$ is defined by equation $$C_{11}(u+1, n+1) = \tilde{W}_8(u_0+1, n_0+1) \quad \text{for } u = u_0, n = n_0,$$
$$= E_3(u_1+1, n_1+1) \quad \text{for } u = 8+u_1, n = 8+n_1,$$
$$= 0 \quad \text{otherwise,}$$

wherein said encoder and said decoder for CDMA communications have memories assigned to said $C_{11}$, $\tilde{W}_8$, $E_3$ codes, said $C_{11}$ codes are generated by reading code chip values from said $\tilde{W}_8$ memory and said $E_3$ memory and combined using said equations to yield said chip values for said $C_{11}$ codes and stored-in said $C_{11}$ memory, said $C_{11}$ codes are read from memory and implemented in said encoder and decoder, using functional combining to construct a second code which is a generalized hybrid Walsh code, wherein an example 11 chip functional combined $c_{11}$ code is constructed from said $C_{11}$ codes by using codes to fill the two null subspaces of said $C_{11}$, wherein said $c_{11}$ codes are read from memory and implemented in said encoder and said decoder, using a combinations of tensor products, direct products, and functional combining to construct said generalized hybrid Walsh codes and, said codes are read from memory and implemented in said encoder for a CDMA communications link and said decoder for said CDMA communications link.

\* \* \* \* \*